Oct. 4, 1932.　　　　H. D. STEVENS　　　　1,880,519
TIRE BUILDING APPARATUS
Filed Oct. 24, 1931　　　5 Sheets-Sheet 1

INVENTOR
Horace D. Stevens
BY
Ely & Barrow
ATTORNEYS

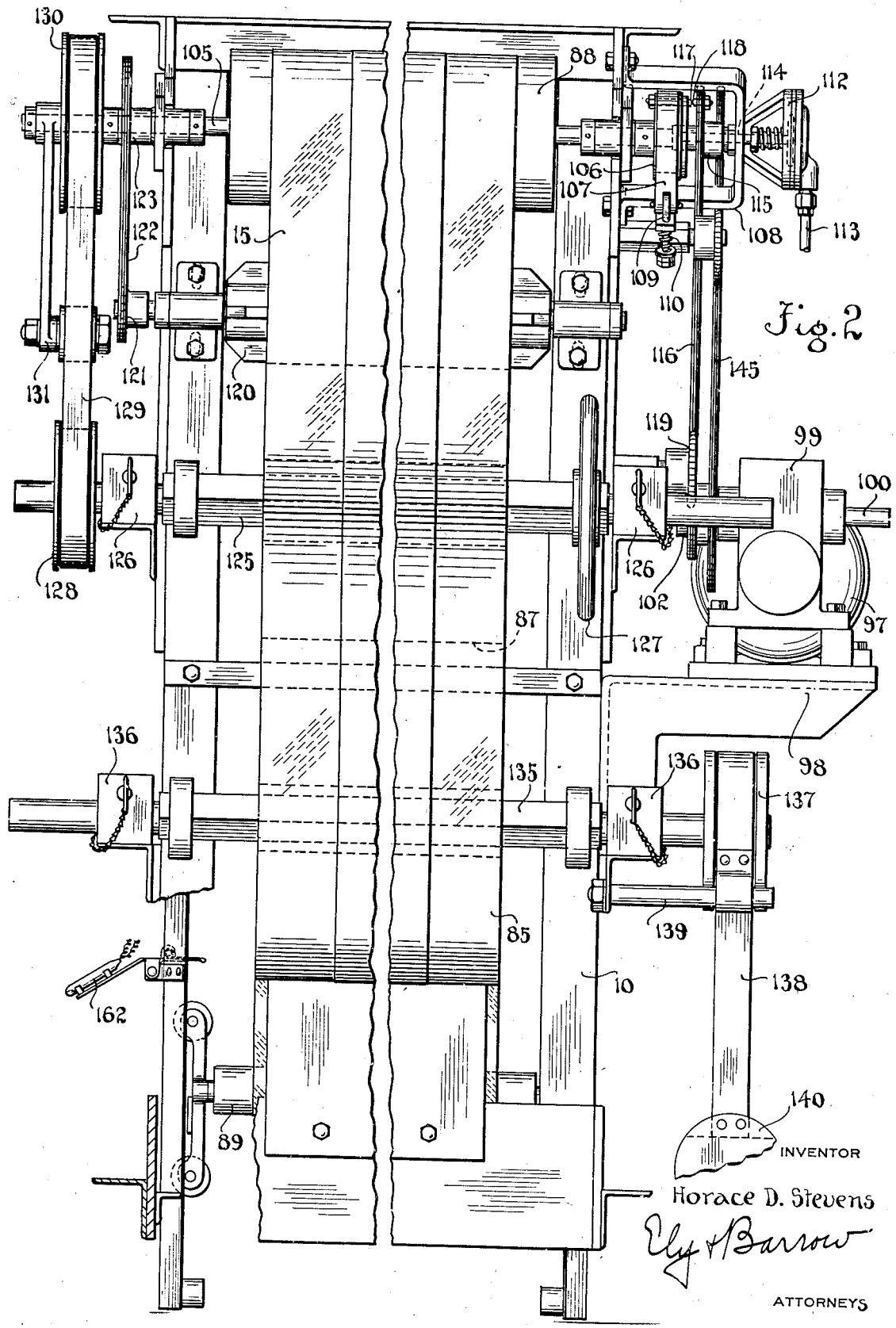

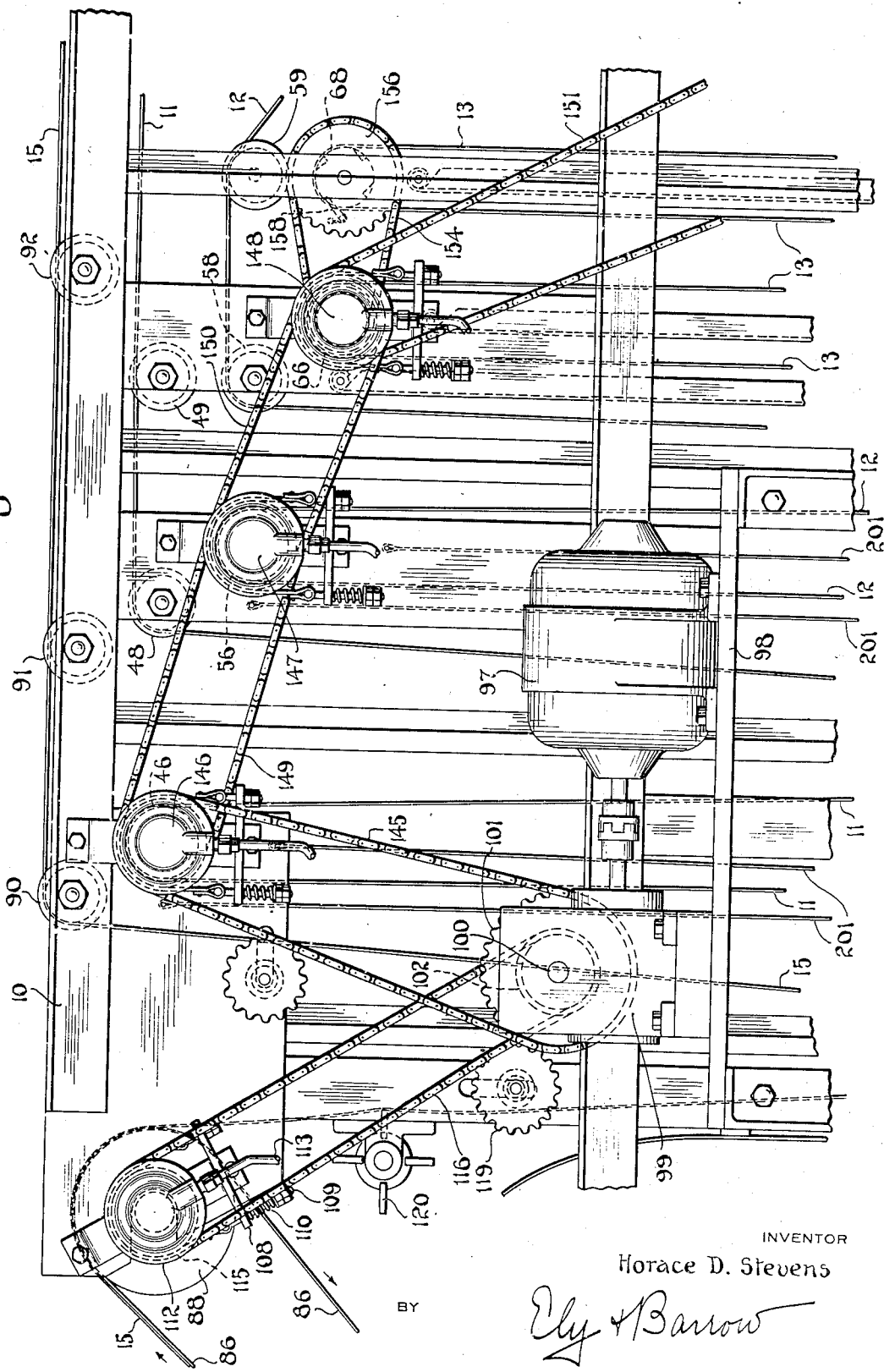

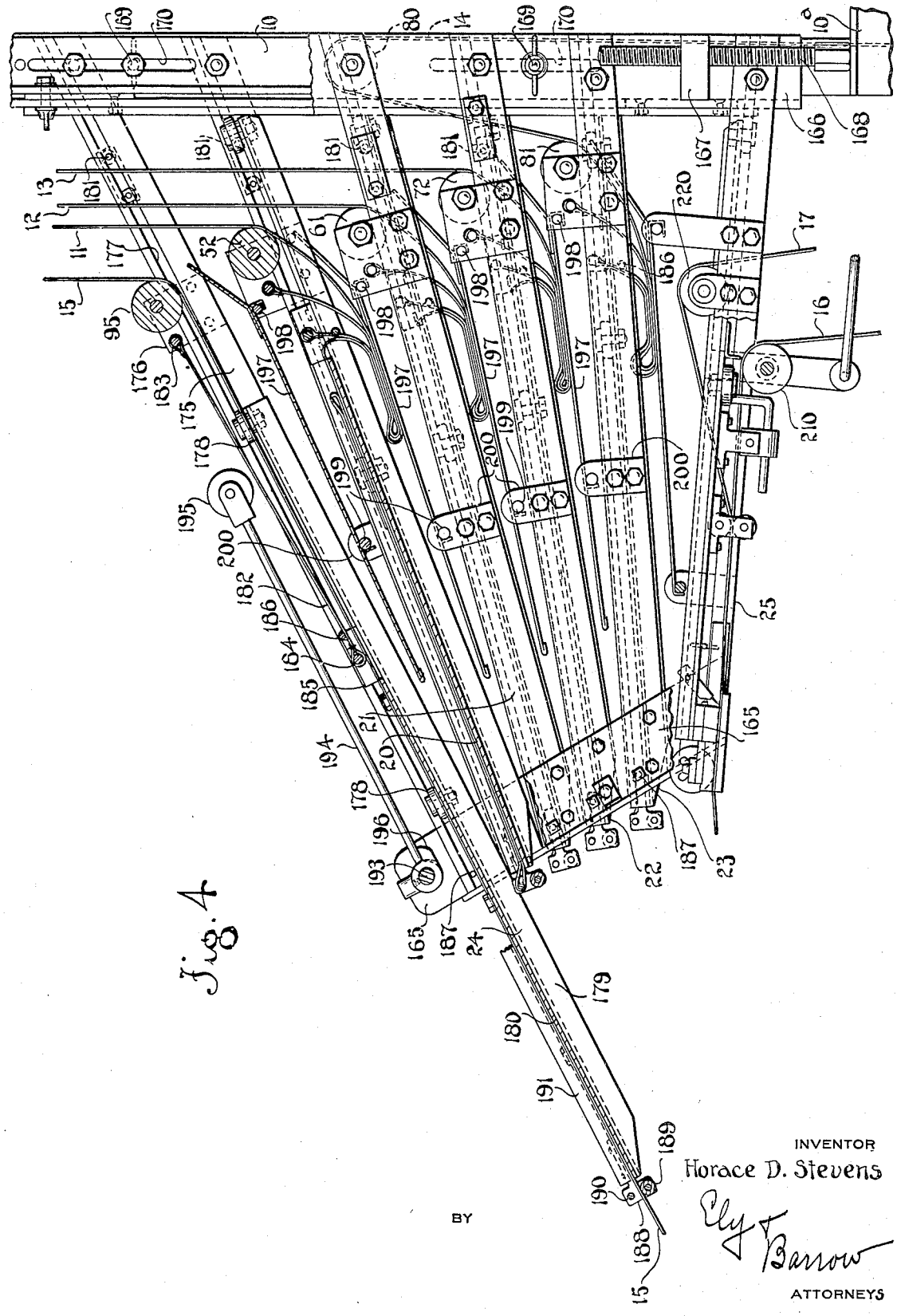

Oct. 4, 1932.  H. D. STEVENS  1,880,519
TIRE BUILDING APPARATUS
Filed Oct. 24, 1931   5 Sheets-Sheet 5
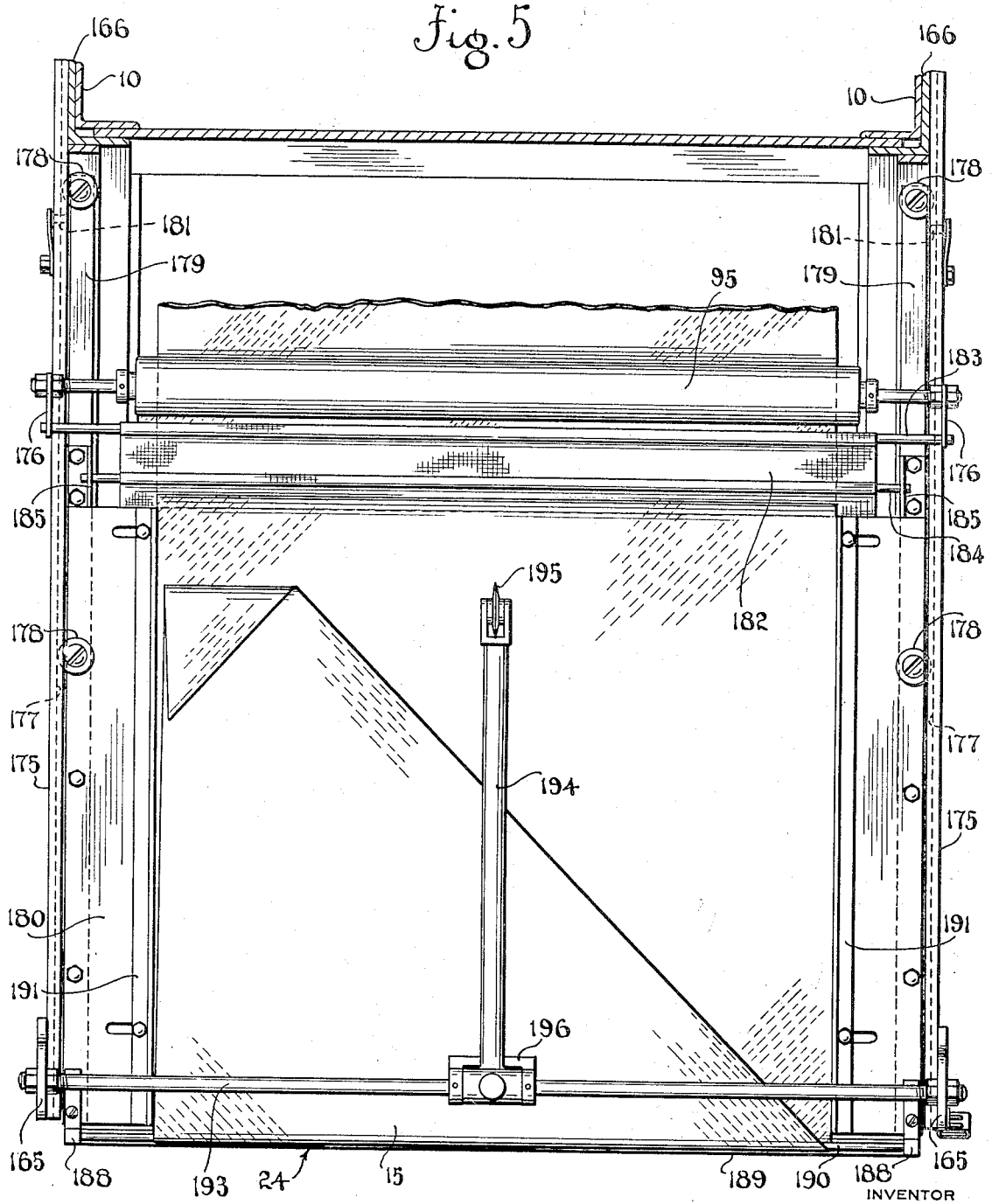

Patented Oct. 4, 1932

1,880,519

UNITED STATES PATENT OFFICE

HORACE D. STEVENS, OF AKRON, OHIO, ASSIGNOR TO THE FIRESTONE TIRE & RUBBER COMPANY, OF AKRON, OHIO, A CORPORATION OF OHIO

TIRE BUILDING APPARATUS

Application filed October 24, 1931. Serial No. 570,851.

This invention relates to tire building apparatus, and more especially it relates to apparatus for storing a plurality of continuous lengths of tire building material in convenient association with a tire building machine whereby the material may be selectively and expeditiously delivered to the building form of said machine.

The invention consists of improvements in storage racks of the equalizer or festooning type wherein several continuous lengths of different kinds of tire building material are stored, each length being adapted for intermittent in-feeding and intermittent out-feeding. The improvements mainly reside in the out-feed mechanism at the delivery end of the apparatus.

The chief object of the invention is to provide improved mechanism for delivering tire building material from a storage rack to a tire building machine. Further objects are to provide for delivering any one of a plurality of lengths of material substantially to the same point, tangentially of a tire building form; and to provide, in such mechanism, means for preventing adhesion of the tacky material when folded or looped upon itself. Other objects will be manifest.

Of the accompanying drawings:

Figure 2 is a fragmentary end elevation thereof on a larger scale, as viewed from the right of Figure 1;

Figure 3 is a fragmentary rear elevation of the apparatus, on the same scale as Figure 2, showing a part of the driving mechanism;

Figure 4 is a detail front elevation of the out-feeding mechanism at the delivery end of the apparatus, parts being broken away and in section; and Figure 5 is a plan view of the mechanism shown in Figure 4.

Figure 1:
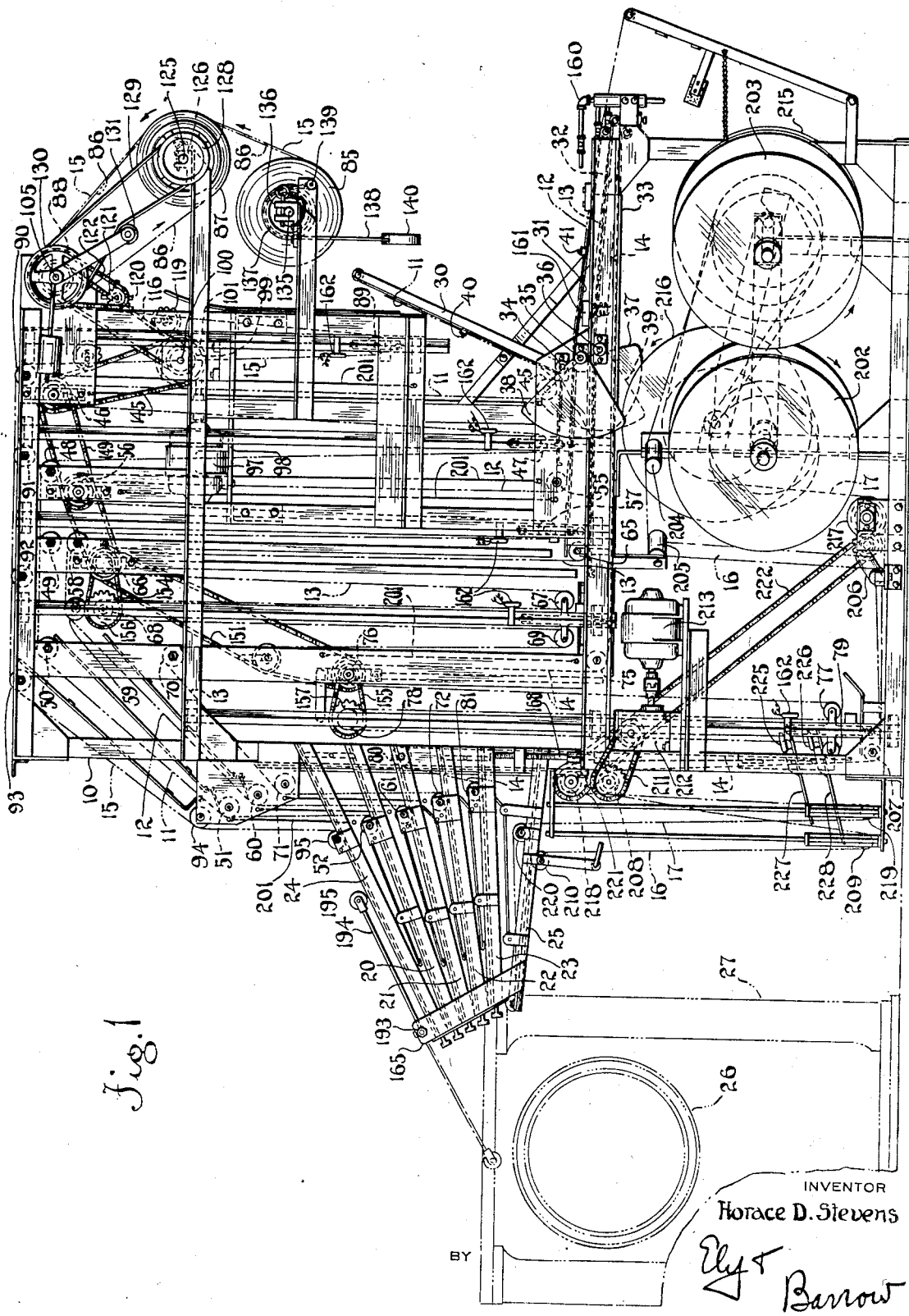
Figure 1 is a front-elevation of apparatus embodying the invention in its preferred form.

Referring to the drawings, there is shown an apparatus for storing five strips of body fabric for the construction of the carcass of a pneumatic tire casing, two rubber sidewall strips, and a strip of breaker fabric. The body fabric is sufficient for the manufacture of 6-ply tires, there being two narrow strips of opposite bias for plies 1 and 2 or the tire, two wide strips of opposite bias for plies 3, 4 and 6 of the tire, and a wide strip of special construction having centrally disposed gum strips on its opposite sides for ply 5 of the tire. Obviously the apparatus shown may be altered to adapt it to the manufacture of a wide range of different tire casings.

As shown in the drawings, the apparatus comprises an upright open framework 10 in the upper part of which is the mechanism for storing and infeeding the five lengths of body fabric, namely, narrow lengths 11 and 12, wide lengths 13 and 14, and special wide length 15. In the lower part of the framework 10 is mechanism for feeding the two sidewall strips, such as the sidewall strip 16, and a breaker strip 17.

At the delivery end of the apparatus are individual guiding mechanisms designated generally 20, 21, 22, 23 and 24, for the respective strips of body fabric 11 to 15 inclusive, and a guiding mechanism 25 is provided for the two sidewall strips 16 and breaker strip 17. Said guiding mechanisms are adapted to deliver the strip material to a point adjacent the tire building drum 26 of a tire building machine shown diagrammatically at 27.

Each of the fabric strips 11 to 15 is supported upon a plurality of fixed and floating rollers, at least one of the fixed rollers being power-driven to effect the in-feeding of the strip. Each strip is arranged in one or more festoons which carry the floating rollers, the festoons shortening or elongating as fabric is withdrawn from or fed into the festoons. The in-feeding of the strips is effected selectively with a single source of power, an operator manually splicing successive short strips of fabric to the trailing ends of the continuous lengths of fabric 11 to 14 inclusive, and then manually operating the proper clutch actuating mechanism to effect the in-feeding of the attached strip, and then releasing said mechanism when the strip is fed far enough. The strip 15 is mounted in the apparatus in a roll, and the latter is replaced only when exhausted. Means is provided for automatically disengaging the strip-driving means if the festoon becomes filled before the operator disengages said driving means.

The splicing of short lengths of fabric to the trailing ends of the continuous strips 11 to 14 is facilitated by the provision of pivotally mounted splicing trays at the work-receiving end of the apparatus. Splicing trays 30, 31, and 32, Figure 1, are provided for the splicing of fabric to the strips 11, 12, and 13 respectively, the strip 14 being spliced upon a flat table 33 mounted upon the framework 10 beneath said splicing trays. The trays 30, 31 and 32 are pivoted on the framework 10 at 34, 35, and 36 respectively, and are provided with respective counterweights 37, 38 and 39 to hold them in elevated position, as is shown with relation to the tray 30, upon occasion, as when a splicing operation is being carried out on an underlying tray or on the table 33. Preferably the splicing trays are provided with respective spring clips for engaging and holding down the ends of the respective fabric strips thereon when the trays are in elevated or tilted position, such clips being shown at 40 and 41 on the trays 30 and 31.

The course of the respective lengths of fabric 11 to 15 through the apparatus is as follows: From the splicing tray 30 the narrow strip 11 extends under fixed roller 45, over fixed roller 46, under floating roller 47, and over fixed rollers 48, 49, 50, and 51 to roller 52 journaled on the guiding mechanism 20 at the delivery end of the apparatus. From the splicing tray 31 the narrow strip 12 extends under fixed roller 55, over fixed roller 56, under floating roller 57, and over fixed rollers 58, 59 and 60 to roller 61 on the guiding mechanism 21. From the splicing tray 32 the wide strip 13 extends under fixed roller 65, over fixed roller 66, under floating roller 67, over fixed roller 68, under floating roller 69, and over fixed rollers 70 and 71 to roller 72 on the guiding mechanism 22. From the splicing table 33 the wide strip 14 extends under fixed roller 75, over fixed roller 76, under floating roller 77, over fixed roller 78, under floating roller 79, and over fixed roller 80 to roller 81 on the guiding mechanism 23.

The special wide strip 15 is taken from a roll 85 comprising the said strip and a liner 86, and strip and liner pass over a liner rewinding roll 87 to a drive roll 88 about which the liner passes and then returns to the rewinding roll, the strip 15 then extending under floating roller 89, and over fixed rollers 90, 91, 92, 93, and 94 to roller 95 on the guiding mechanism 24.

It will be observed that the strips 13 and 14 are arranged in double festoons whereas the festoons of the strips 11 and 12 are single. This provides greater storage for the strips 13, 14, which is desirable in view of the fact that the strip 14 is used for the fourth and sixth plies of the tire, and the strip 13 may be used for the fifth as well as the third ply if the fifth ply is standard instead of special.

The feeding of the strips 11 to 15 into their respective festoons is effected by driving the fixed roller at the receiving side of the festoon, and in the case of strips 13 and 14 having double festoons, two of the fixed rollers are driven, the second roller being driven at half the speed of the first roller so as to keep the two parts of the double festoon at equal length. Power means for driving the feed rollers of the respective strips 11 to 15 comprises a motor 97 that is mounted upon a shelf 98 supported upon the framework 10, said motor being direct-connected to a reduction-gear device 99 also mounted upon the shelf 98 and having a countershaft 100 projecting therefrom upon which are mounted sprockets 101, 102. The motor is constantly driven, and suitable fluid-pressure actuated clutches are provided by means of which the respective feed rollers may be selectively driven. Said clutch mechanism will be described in detail in its association with the driving means for the strip 15.

Referring especially to Figures 2 and 3, the feed roller 88 of the strip 15 is mounted upon a shaft 105 that is journaled in the framework 10 and extends beyond said journals at each end, its rearward extension being provided with a brake drum 106 that is engaged by a brake band 107, the latter having one end fixedly connected to a bracket 108 and having its other end connected to a stud 109 that is suitably supported upon the bracket 108 and urged by a compression spring 110 in the direction to maintain the brake band 107 taut at all times, yet permitting forward driving of the brake drum, and the shaft 105.

The bracket 108 also carries a fluid pressure-actuated diaphragm valve 112 that is provided with the usual fluid inlet and outlet pipe 113, and has a plunger or piston 114 that is co-axial with the shaft 105, and has journaled thereon a sprocket 115 that is connected by a sprocket chain 116 to the sprocket 102 of the reduction gear device 99. The sprocket 115 is positioned beside the brake drum 106, the arrangement being such that it is moved toward the brake drum when the valve 112 is charged. The adjacent faces of the brake drum 106 and sprocket 115 are provided respectively with laterally extending studs 117, 118, having orbits of the same diameter so that when the sprocket is moved toward the brake drum the studs become engaged to effect driving connection between the constantly driven sprocket 115 and the shaft 105 that carries the feed roller 88. The usual sprocket 119 is provided for tightening the chain 116.

Journaled in suitable brackets that are mounted on the framework 10 is a rotatable beater 120 comprising four radial blades that may consist of flexible material if desired. The shaft of the beater 120 is provided with a sprocket 121 that is connected by a sprocket chain 122 with a sprocket 123 mounted upon the shaft 105, on the near side of the apparatus as viewed in Figure 1, so that the beater rotates with the feed roller 88. The beater is so positioned that it engages the strip material 15 close to the point where the latter leaves the said feed roller, and by beating against said strip material in the direction of the feed of the material assures the separation thereof from the liner 86 notwithstanding the tacky character of the material.

The liner rewinding roll 87 is mounted upon a square shaft 125 that is removably journaled on bearing blocks 126, 126 mounted upon the framework 10. The shaft 125 is provided with a hand wheel 127 by which it may be manually rotated, upon occasion, as when the leading end of a new liner is being started upon the rewinding roll. The end portions of the shaft 125 extend beyond their journals, and on the near side of the apparatus the said shaft has mounted thereon a flanged pulley 128 that is connected by a driving belt 129 with a flanged pulley 130 mounted upon the near end of the shaft 105. The usual belt tightener 131 is provided for the belt 130. The arrangement is such that the liner rewinding roll 87 is driven concurrently with the feed roller 88, the feature of the belt drive permitting slippage therein to compensate for the varying surface speed of the rewinding roll as it increases in size due to building up of the liner thereon.

The roll 85 of fabric 15 and liner 86 is carried on a square shaft 135 that is removably journaled in bearing blocks 136, 136 mounted upon the frame work 10. The far end of the shaft 135 is provided with a brake drum 137 that is engaged by a brake band 138 having one end permanently secured to a spindle 139 and having a weight 140 suspended from its other end. The arrangement prevents over-run of the roll 85 when the feeding of strip 15 stops.

The selective driving of the feed rollers of the respective fabric strips 11 to 14 is effected by mechanism similar to that provided for driving the feed roller 88 of the strip 15. Thus the feed roller 46 of the strip 11 is adapted to be driven by a sprocket chain 145 from the constantly driven sprocket 101 of the reduction gear device 99, there being a fluid pressure-actuated valve 146 provided for moving a sprocket (not shown), driven by the chain 145 into driving engagement with said feed roller 46. In like manner feed rollers 56, 66 and 76 for the strips 12, 13 and 14 are provided with respective fluid pressure-actuated valves 147 and 148 (the valve for the feed roller 76 not being shown) which valves shift constantly driven sprockets (not shown) into driving engagement with said feed rollers. Sprocket chains 149, 150, and 151 are provided for driving the said sprockets (not shown) that are associated with the valves 146, 147, 148 and the valve (not shown) associated with the feed roller 76.

The feed rollers 68 and 78 that are associated with the feed rollers 66 and 76 for feeding fabric into the double festoons of the strips 13 and 14 are driven by the rollers 66 and 76, at half the speed thereof, by means of respective sprocket chains 154, 155 that engage sprockets 156, 157 respectively that are associated with said rollers 68, 78. There are pawl and ratchet connections between the feed rollers 68, 78 and the sprockets 156, 157, such a connection being shown at 158, Figure 3.

The diaphragm valves that serve to clutch and unclutch the feed-roll drives are manually selectively controlled by a set of valves at 160, within easy reach of the operator who splices the short lengths of fabric to the continuous strips 11 to 14. The diaphragm valves function as long as their respective control valves are operated, the latter operating automatically to exhaust the diaphragm valves when the operator releases them. An illuminated warning signal 161 positioned conveniently near the splicing trays automatically is lighted when any festoon becomes full before any in-feeding operation is completed, said warning signal being controlled by a series of mercury switches 162, 162 positioned in the path of frames that support the floating rollers of the respective festoons, near the bottom of said paths, as is most clearly shown in Figure 2.

The guiding mechanisms 20 to 25 for the strips 11 to 17 inclusive, at the delivery end of the apparatus, are mounted as a unit upon the frame work 10, said mechanisms being fixedly mounted with relation to each other, and converging toward each other at their outer ends. The delivery mechanisms are secured together at their outer ends by lateral tie-members 165, 165, and at their inner ends the said mechanisms are mounted upon lateral angles 166, 166 that engage the end members of the framework 10. Each of the angles 166 is formed with an outstanding lug or ear 167 through which is threaded a screw 168 that has its head resting upon a projecting portion 10$^a$ of the framework 10, the arrangement providing vertical adjustability of the guiding mechanisms as a unit. Bolts 169, 169 provided with thumb nuts extend through each angle 166 and through slots 170, 170 formed in the adjacent member of the framework 10, whereby the guiding assembly may be secured in properly adjusted position. The guiding mechanisms 20 to 24 inclusive are substantially identical in structure so that a detail description of the mechanism 24 will suffice for all, attention being especially directed to Figures 4 and 5.

The guiding mechanism 24 comprises a pair of parallel side plates 175, 175 which are provided with respective journal brackets 176, 176 adjacent their work-receiving ends, said brackets supporting the fixed roller 95. Each side plate has its inner face formed with a longitudinal groove 177, which grooves constitute runways for rollers or casters 178, 178 mounted upon the lateral marginal portions of a tray structure comprising lateral frame members 179, 179, and a flat tray 180 mounted thereon, the frame members 179 extending beyond the rear of the tray as shown. The rollers 178 are mounted upon the rear ends of the frame members 179, and upon the tray 180 at about the middle of the frame members 179.

The tray structure is alternatively positionable in the inoperative, retracted position shown in Figure 5, or in the operative, projected position shown in Figure 4. The tray structure normally is held in retracted position by spring pressed detents 181, 181 that extend through the side plates 175 and into the respective grooves 177 therein, in front of the rear rollers 178 when the latter are in their rearmost position. The forward, operative position of the tray structure is controlled by a flexible sheet or apron 182 of fabric, which apron has its rear marginal portion mounted upon a rod 183 that is supported by the brackets 176, and has its front marginal portion supported upon a rod 184 that is carried by brackets 185, 185 mounted upon the respective frame members 179, adjacent the rear margin of the tray 180. A rod 186 is secured to the apron 182 adjacent the rod 184, said rod 186 constituting a weight for a purpose subsequently to be explained. Preferably studs 187, 187 are threaded through the tie members 165 and side plates 175 and extend into the respective grooves 177 at the forward ends thereof, the arrangement providing positive means for preventing accidental removal of the tray structure.

Mounted upon the forward marginal portion of the tray 180 and extending beyond the same at opposite sides thereof are brackets 188, 188 that support a roller 189 that is disposed slightly above the tray. Mounted upon the upper face of the tray are laterally adjustable lateral guide strips 191, 191 for the strip material 15, the forward end of the latter normally being folded back upon itself, around the rod 190, as is most clearly shown in Figure 5. It will be observed that the strip 15 in passing from the roller 95 to the tray 180 extends beneath the apron 182.

The upper end portions of the lateral tie members 165 extend above the upper tray structure and carry a fixedly mounted rod 193 upon which is pivotally mounted an arm 194 that has a beveled-edge disc 195 journaled in its free end. The arm 194 is positioned exactly midway between the guide strips 191, and has a normal inoperative position, shown in full lines in Figures 1, 4 and 5, and an operative position shown in broken lines in Figure 1 in which the disc 195 is disposed adjacent the periphery of a tire being built upon the tire building drum 26. A bracket 196 is fixedly mounted upon the rod 193 and has a portion so positioned as to constitute a support for the arm 194 in the inoperative position of the latter. In its operative position the disc 195 serves as a guide for the centering of a tread slab (not shown) as the said slab is manually mounted upon the tire building drum.

The respective guiding mechanisms 20, 21, 22 and 23 are substantially the same as mechanism 24, differing only in the feature of a metal canopy or plate 197 that is positioned over the rear half of each tray 180, and over the roller 52, 61, 72 or 81 at the rear of the tray. The canopy 197 is supported upon suitable rods 198, 199 that are carried respectively by the brackets 176, and by brackets 200 that are mounted upon the side plates 175 forwardly of the brackets 176.

In the operation of the hereinbefore described apparatus, the fabric strip 15 is fed into the apparatus from the supply roll thereof 85. The fabric strips 11 to 14 are fed into the apparatus intermittently as additional short lengths are spliced to their trailing ends. These operations are performed by a single operator at the receiving end of the apparatus, who sees that the festoons are kept substantially full at all times. At the delivery end of the apparatus a tire builder withdraws fabric selectively from the various festoons by drawing forward the proper tray structure so that the forward end thereof is disposed adjacent to and tangentially of the tire building drum, then attaching the leading end of the strip material on the tray adhesively to the tire being built, and then rotating the said drum to draw the strip material around the drum. When a ply of fabric has been wrapped about the drum, the strip of fabric is severed, the leading end of the supply strip is laid back over the rod 190, and the tray structure pushed back into inoperative position. The operations described are repeated with fabric from the other guiding mechanisms until the tire carcass is completed.

When a tray structure is returned to inoperative position, the apron 182 thereof is slackened, and the weight-rod 186 thereon causes said apron, and the fabric strip thereunder, to loop downwardly until it rests upon the canopy 197 of the underlying guiding mechanism, the apron and fabric lying in a single large fold when the tray structure is completely retracted as is most clearly shown in Figure 4. In this position the apron lies within the fold of fabric, and thus prevents the sticking together of the tacky surfaces thereof, and the canopy 197 prevents the fold of material from touching the strip material on the underlying guiding mechanism.

At various places throughout the apparatus, between vertical reaches of the strips of material, are suspended screens or aprons 201, 201 which prevent said strips from swaying into contact with each other, and thus prevent adhesion of the tacky strips to each other.

The handling of the sidewalls 16 and breaker strip 17 in the apparatus is effected in much the same manner as the fabric strip 15. Only the sidewall mechanism, on the near side of the apparatus, is shown. The sidewall stock is mounted in the apparatus in a roll 202 which includes an interwound liner, the latter being re-wound on a suitable roll 203 about which the liner and sidewall passes, the latter then extending successively over fixed guide rollers 204, 205, 206, and 207, feed roller 208, floating roller 209, thence to a fixed roller 210 on the guiding mechanism 25. The feed roller 208 is driven by a sprocket chain 211 from a reduction gear device 212 that is directly connected to a motor 213. The feed roller 208 extends to the far side of the apparatus where it serves to feed the other sidewall 16.

The breaker strip material 17 is mounted in the apparatus in a roll 215 that includes a liner, the strip and liner passing about a liner re-winding roll 216 upon which the liner is wound, the breaker strip then extending to a feed roller 217, a fixed guide roller (not shown) that is axially aligned with roller 207, a fixed feed roller 218, floating roller 219, thence to a fixed roller 220 on the guiding mechanism 25. The feed rollers 217 and 218 are driven by sprocket chains 221, 222 respectively that are connected with a reduction gear device (not shown) connected to a motor (not shown), which reduction gear device and motor are transversely aligned with the similar members 212, 213.

The guiding mechanism 25 is quite similar to the guiding mechanisms 20 to 24, and operates in substantially the same manner, except that no fold in the material is effected by retractive movement of the tray, the surplus material merely dropping back into the respective festoons thereof. The operation of the motors that feed the breaker strip and sidewall strips into festoons is automatic, said motors being controlled by respective mercury switches 225, 226 that are suitably mounted upon pivoted arms 227, 228 that extend into the respective paths of the floating rollers 209, 219, whereby determinate rise and fall of the said rollers automatically connects or disconnects the motors from their source of power.

The invention conserves the time and labor of the tire builder, obviates stretching of the tire building material, and accomplishes the other objects set out in the foregoing statement of objects.

The apparatus may be modified within the scope of the appended claims which are not limited wholly to the specific construction shown and described.

What is claimed is:

1. Tire building apparatus comprising fixed and floating rollers supporting a plurality of strips of tire building material in festoons, and screens of non-adhesive material between respective reaches of the tire building material preventing adhesion of said reaches to each other.

2. Tire building apparatus comprising fixed and floating rollers supporting a plurality of strips of tire building material in festoons, guiding mechanism at the delivery end of the apparatus having retracted and projected positions, and flexible aprons of non-adhesive material associated with at least one of the guiding mechanisms and so arranged as to lie within a fold of tire building material, in the retracted position of the mechanism, to prevent adhesion of the parts of said fold.

3. A combination as defined in claim 2 in which the apron is so constructed and arranged as to limit the projected position of the guiding mechanism.

4. Tire building apparatus comprising means for delivering a plurality of lengths of tire building material to a delivery position, guiding mechanisms thereat for the respective lengths of material, said mechanisms being arranged in superposed relation and having projected and retracted positions, in the latter of which the tire building material is disposed in depending loops, and canopies on the respective guiding mechanisms supporting the loop of material from the superposed mechanism.

5. A combination as defined in claim 4 including flexible aprons of non-adhesive material on the respective guiding mechanisms arranged to lie within the respective loops of tire building material.

6. Tire building apparatus comprising means for delivering a plurality of continuous strips of tire building material to a delivery position, guiding mechanisms thereat for the respectve lengths of material, said mechanisms being arranged in superposed relation and having projected and retracted positions, in the latter of which the tire building material is disposed in depending loops, canopies on the underlying mechanisms supporting said loops, and flexible aprons on the respective guiding mechanisms so arranged as to limit the projected positions of the mechanisms, and to lie within the loops of material in the retracted position of the mechanisms.

7. Tire building apparatus comprising means for feeding a continuous length of tire building material to a delivery station, delivery mechanism thereat comprising a pair of lateral supports, a tray movable longitudinally thereof, a flexible apron connecting said supports and said tray so as to limit the movement of the latter in one direction, and means for guiding the length of material beneath said apron.

8. A combination as defined in claim 7 including means on the apron causing it to fold always in the same direction when slack.

9. Tire building apparatus comprising means for conveying a continuous length of tire building material to a delivery station, delivery mechanism thereat comprising a pair of downwardly inclined lateral supports, a tray movable longitudinally of said supports, a flexible apron connecting the tray to a stationary member on said supports whereby downward projected movement of the tray is determinately limited, means for guiding the length of material beneath the apron and onto the tray, and yielding means for holding the tray in its upper retracted position.

10. A combination as defined in claim 9 including a weight arranged transversely of the apron causing it always to fold in the same direction when slack.

In witness whereof I have hereunto affixed my signature this 5th day of September, 1931.

HORACE D. STEVENS.